(12) United States Patent
Lee et al.

(10) Patent No.: US 9,965,359 B2
(45) Date of Patent: May 8, 2018

(54) LOG FORWARDING TO AVOID DEADLOCKS DURING PARALLEL LOG REPLAY IN ASYNCHRONOUS TABLE REPLICATION

(71) Applicants: Juchang Lee, Seoul (KR);
Chang-Gyoo Park, Seoul (KR);
Hyoung-Jun Na, Seoul (KR);
Deok-Hoe Kim, Seoul (KR)

(72) Inventors: Juchang Lee, Seoul (KR);
Chang-Gyoo Park, Seoul (KR);
Hyoung-Jun Na, Seoul (KR);
Deok-Hoe Kim, Seoul (KR)

(73) Assignee: SAP SE, Walldorf (DE)

( * ) Notice: Subject to any disclaimer, the term of this patent is extended or adjusted under 35 U.S.C. 154(b) by 291 days.

(21) Appl. No.: 14/657,854

(22) Filed: Mar. 13, 2015

(65) Prior Publication Data
US 2016/0147858 A1 May 26, 2016

Related U.S. Application Data

(60) Provisional application No. 62/084,065, filed on Nov. 25, 2014.

(51) Int. Cl.
*G06F 17/30* (2006.01)
*G06F 11/14* (2006.01)

(52) U.S. Cl.
CPC ...... *G06F 11/1469* (2013.01); *G06F 11/1464* (2013.01); *G06F 17/30368* (2013.01); *G06F 17/30371* (2013.01); *G06F 17/30377* (2013.01); *G06F 17/30575* (2013.01); *G06F 17/30578* (2013.01); *G06F 17/30876* (2013.01); *G06F 2201/80* (2013.01)

(58) Field of Classification Search
USPC ....... 707/615, 685, 612, 611, 633, 610, 678, 707/607, 613
See application file for complete search history.

(56) References Cited

U.S. PATENT DOCUMENTS

| | | |
|---|---|---|
| 5,737,601 A | 4/1998 | Jain et al. |
| 5,806,074 A | 9/1998 | Souder |
| 5,878,434 A | 3/1999 | Draper et al. |
| 6,012,059 A | 1/2000 | Neimat et al. |
| 6,014,673 A * | 1/2000 | Davis ............. G06F 11/1471 |
| 6,058,389 A | 5/2000 | Chandra et al. |
| 6,374,263 B1 | 4/2002 | Bunger et al. |
| 6,446,089 B1 | 9/2002 | Brodersen et al. |

(Continued)

*Primary Examiner* — Jeffrey A Burke
*Assistant Examiner* — Thong Vu
(74) *Attorney, Agent, or Firm* — Sterne, Kessler, Goldstein & Fox, PLLC

(57) ABSTRACT

Disclosed herein are system, method, and computer program product embodiments for removing a deadlock during replication from distributed source tables to a replica node. An embodiment operates by detecting a deadlock at a parallel log replayer at a replica node. A first replication log entry from a queue at the parallel log replayer is then selected based on whether removing the first replication log entry from the queue removes the deadlock. The first replication log entry is then forwarded to a waiting queue. A second replication log entry is then replayed at the parallel log replayer. After replaying the second replication log entry, the first replication log entry is replayed at the parallel log replayer.

21 Claims, 14 Drawing Sheets

(56) References Cited

U.S. PATENT DOCUMENTS

| | | | |
|---|---|---|---|
| 6,546,394 B1 | 4/2003 | Chong et al. | |
| 6,658,540 B1* | 12/2003 | Sicola | G06F 11/2007 |
| | | | 707/999.202 |
| 6,732,124 B1* | 5/2004 | Koseki | G06F 11/1435 |
| 7,031,974 B1 | 4/2006 | Subramaniam | |
| 7,765,186 B1* | 7/2010 | Hu | G06F 9/466 |
| | | | 707/612 |
| 8,015,161 B2 | 9/2011 | Sinha et al. | |
| 8,086,598 B1 | 12/2011 | Lamb et al. | |
| 8,903,779 B1* | 12/2014 | Holenstein | G06F 11/1469 |
| | | | 707/685 |
| 8,909,604 B1* | 12/2014 | Holenstein | G06F 11/1469 |
| | | | 707/678 |
| 8,984,513 B2 | 3/2015 | Bergheaud et al. | |
| 9,116,862 B1 | 8/2015 | Rath et al. | |
| 9,251,003 B1* | 2/2016 | Gupta | G06F 11/1469 |
| 9,411,866 B2 | 8/2016 | Bartholomä et al. | |
| 9,489,443 B1* | 11/2016 | Muniswamy-Reddy | G06F 17/30575 |
| 9,519,664 B1* | 12/2016 | Kharatishvili | G06F 17/30321 |
| 9,632,878 B1* | 4/2017 | Maccanti | G06F 11/1469 |
| 2002/0165724 A1 | 11/2002 | Blankesteijn | |
| 2004/0098425 A1 | 5/2004 | Wiss et al. | |
| 2004/0133591 A1 | 7/2004 | Holenstein et al. | |
| 2004/0225865 A1 | 11/2004 | Cox et al. | |
| 2004/0267835 A1 | 12/2004 | Zwilling et al. | |
| 2005/0049945 A1 | 3/2005 | Bourbonnais | |
| 2005/0097103 A1 | 5/2005 | Zane et al. | |
| 2005/0114409 A1 | 5/2005 | Sinha et al. | |
| 2005/0262170 A1* | 11/2005 | Girkar | G06F 17/30575 |
| 2006/0190503 A1 | 8/2006 | Naicken et al. | |
| 2008/0033914 A1 | 2/2008 | Cherniack et al. | |
| 2008/0052322 A1 | 2/2008 | Gusciora | |
| 2008/0250057 A1 | 10/2008 | Rothstein et al. | |
| 2008/0263106 A1* | 10/2008 | Asherman | G06F 17/30578 |
| 2009/0313311 A1* | 12/2009 | Hoffmann | G06F 11/2094 |
| 2010/0011013 A1 | 1/2010 | Singh | |
| 2010/0049718 A1* | 2/2010 | Aronovich | G06F 17/30115 |
| | | | 707/607 |
| 2010/0191884 A1 | 7/2010 | Holenstein et al. | |
| 2011/0082832 A1 | 4/2011 | Vadali et al. | |
| 2011/0087633 A1* | 4/2011 | Kreuder | G06F 17/30578 |
| | | | 707/610 |
| 2011/0246503 A1 | 10/2011 | Bender et al. | |
| 2011/0302143 A1* | 12/2011 | Lomet | G06F 17/30008 |
| | | | 707/704 |
| 2012/0005174 A1 | 1/2012 | Vora | |
| 2012/0089566 A1 | 4/2012 | Effern et al. | |
| 2012/0151272 A1* | 6/2012 | Behrendt | G06F 9/542 |
| | | | 714/39 |
| 2012/0254867 A1* | 10/2012 | Lind | G06F 9/466 |
| | | | 718/1 |
| 2012/0278282 A1 | 11/2012 | Lu et al. | |
| 2012/0303577 A1* | 11/2012 | Calder | G06F 11/2074 |
| | | | 707/613 |
| 2012/0330954 A1* | 12/2012 | Sivasubramanian | G06F 9/5061 |
| | | | 707/737 |
| 2013/0124467 A1 | 5/2013 | Naidu et al. | |
| 2013/0198133 A1* | 8/2013 | Lee | G06F 17/30581 |
| | | | 707/611 |
| 2013/0339312 A1 | 12/2013 | Schreter | |
| 2014/0006342 A1 | 1/2014 | Love et al. | |
| 2014/0136473 A1 | 5/2014 | Faerber et al. | |
| 2014/0172794 A1 | 6/2014 | Bartholomä et al. | |
| 2014/0172803 A1 | 6/2014 | Diaconu et al. | |
| 2014/0172898 A1 | 6/2014 | Aguilera et al. | |
| 2014/0258660 A1* | 9/2014 | Cheriton | G06F 11/1471 |
| | | | 711/162 |
| 2014/0372489 A1 | 12/2014 | Jaiswal et al. | |
| 2015/0006466 A1 | 1/2015 | Tonder et al. | |
| 2015/0088824 A1 | 3/2015 | Kamp et al. | |
| 2015/0234842 A1 | 8/2015 | Kumar et al. | |
| 2015/0242400 A1 | 8/2015 | Bensberg et al. | |
| 2015/0242451 A1 | 8/2015 | Bensberg et al. | |
| 2015/0269239 A1 | 9/2015 | Swift et al. | |
| 2015/0286668 A1 | 10/2015 | Legler | |
| 2016/0092468 A1* | 3/2016 | Hildebrand | G06F 17/30215 |
| | | | 707/633 |
| 2016/0110403 A1* | 4/2016 | Lomet | G06F 17/30356 |
| | | | 707/695 |
| 2016/0147617 A1 | 5/2016 | Lee et al. | |
| 2016/0147618 A1 | 5/2016 | Lee et al. | |
| 2016/0147859 A1 | 5/2016 | Lee et al. | |

* cited by examiner

|Primary Key|Column 1|Row-ID|
|---|---|---|
|10|"Thomas"|r1|

502 - T1 inserts a row

|Primary Key|Column 1|Row-ID|
|---|---|---|
|~~10~~|~~"Thomas"~~|~~r1~~|

504 - T2 deletes the row

|Primary Key|Column 1|Row-ID|
|---|---|---|
|20|"Thomas"|r2|

506 - T3 inserts a row

FIG. 5

Source Table 802

| Primary Key | Column 1 | Row-ID |
|---|---|---|
| Row 1 | 10 | "A" | r1 |
| Row 2 | 11 | "C" | r3 |
| Row 3 | 12 | "D" | r5 |
| Row 4 | 13 | "B" | r9 |
| Row 5 | | | |

Replica Table 804

| Primary Key | Column 1 | Row-ID |
|---|---|---|
| 10 | "A" | r1 |
| 11 | "B" | r2 |
| 12 | "B" | r4 |
| 14 | "B" | r9 |

FIG. 8

LOG FORWARDING TO AVOID DEADLOCKS DURING PARALLEL LOG REPLAY IN ASYNCHRONOUS TABLE REPLICATION

CROSS-REFERENCE TO RELATED APPLICATIONS

This application claims benefit of U.S. Provisional Patent Application No. 62/084,065 filed Nov. 25, 2014, which is assigned to the assignee of the present patent application, the contents of which are incorporated herein by reference in their entirety.

BACKGROUND

Database management systems often need to be able to handle a large number of database transactions. This is often the case where database management systems are used by insurance companies, financial services companies, or e-commerce websites. In order to handle a large number of database transactions, database management systems often distribute read transactions to replica tables at a replica node. Database management systems maintain the replica tables by replicating changes from the source tables at a source node to the corresponding replica tables at the replica node. In order to further improve database transaction performance for the database management system, the source tables may be distributed across multiple source nodes. But when the source tables are distributed across multiple source nodes, a deadlock may result when the database management system replicates changes to the replica tables. This results in replication being halted and creates a visibility gap between the source tables and the replica tables.

BRIEF DESCRIPTION OF THE DRAWINGS

The accompanying drawings are incorporated herein and form a part of the specification.

FIG. 5 illustrates an example of how data integrity is ensured during parallel log replay, according to the example embodiment described in FIG. 2.

FIG. 8 illustrates an example of row-ID based lost change detection and resynchronization, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
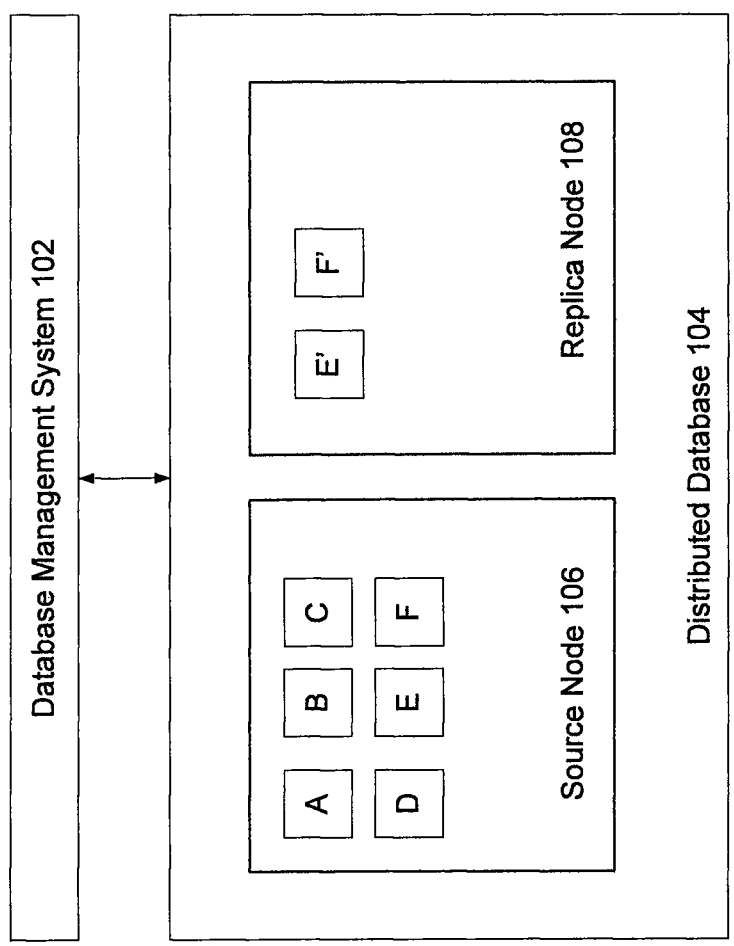
FIG. 1 is a block diagram of a distributed database system with table replication, according to an example embodiment.

Provided herein are system, method and/or computer program product embodiments, and/or combinations and sub-combinations thereof, for resolving a deadlock in a database management system supporting table replication from distributed source tables with transactional and parallel log replay. An embodiment operates by detecting a deadlock at a parallel log replayer at a replica node. A replication log entry is then selected by the database management system from a queue at the parallel log replayer based on whether removing it from the queue resolves the deadlock. The database management system then forwards the selected replication log entry to a waiting queue. The database management system then replays the remaining replication log entries in parallel at the parallel log replayer. Accordingly, by having the database management system forward replication log entries to a waiting queue, the deadlock is eliminated and table replication is not halted. This further minimizes the visibility gap between the source tables and the replica tables.

A database management system is a collection of computer software programs that control the organization, storage, and retrieval of data in a database. A database is an organized collection of data. A database may be organized according to a database model. A database model determines the logical structure of a database and how data is stored, organized, and manipulated. For example, a relational model is a popular database model.

A relational database model organizes data as a set of tables from which data can be accessed or reassembled in many different ways without having to reorganize the tables. Each table may contain one or more data categories in columns. Each row may contain a unique instance of data for the categories defined by the columns. For example, a business order entry database may include a table that describes a customer with columns for name, address, phone number, and so forth. Each row may have a primary key. A primary key is a column, or combination of columns, designated to uniquely identify a row.

Each table may be represented using either row-based storage or column-based storage. In row-based storage, the database management system stores data row by row in the database. In column-based storage, the database management system stores data column by column in the database.

A database management system that uses column-based storage is often faster than a database management system that uses row-based storage. This is often the case when a database management system performs read intensive operations on a large data repository. This is because a column-oriented database management system only needs to scan the relevant columns when performing an operation. In contrast, a row-oriented database management system must scan the columns of the rows it is reading.

A column-oriented database system is often chosen where operations may be performed on only a few columns. Similarly, a column-oriented database system may be chosen where a table has a large number of columns, or a table has a large number of rows and column operations are typically performed by the database management system.

A request to query, insert, or update a database may be made to a database management system using a database language. A database language is a computer language used to make requests of a database management system. For example, Structured Query Language (SQL) is a database language used to communicate with a database management system.

A request to query, insert, or update a database may be performed as a database transaction by a database management system. A database transaction consists of one or more independent units of work, each reading or writing data to the database. A database transaction may be read or write. A read database transaction does not write data to the database. For example, a query is a read database transaction. A write database transaction writes data to the database. For example, an insert is a write database transaction.

A database management system executes a database transaction either completely or not at all. If no errors occur during the execution of the database transaction then the database management system commits the transaction to the database. The database management system commits a database transaction to the database by executing a transaction commit operation. A transaction commit operation causes the database management system to apply all data manipulations within the scope of the database transaction to the database.

If an error occurs during the execution of the database transaction, none of the data manipulations within the scope of the database transaction are applied by the database management system to the database. In no case can a partially complete database transaction be committed by the database management system to the database. In other words, execution of a database transaction by the database management system always leaves the database in a consistent state.

A database management system executes a database transaction in isolation from other database transactions. Furthermore, the database management system checks that the result of executing a database transaction satisfies existing database constraints. In order to track and manage each database transaction, the database management system assigns each database transaction a transaction ID.

FIG. 1 illustrates a distributed database system 100 with table replication, according to an example embodiment. Distributed database system 100 includes a database management system 102 and a distributed database 104.

Database management system 102 is a collection of computer software programs that control the organization, storage, and retrieval of data in distributed database 104. A request to query, insert, or update data in distributed database 104 is performed as a database transaction by database management system 102.

Distributed database 104 is stored in source node 106 and replica node 108. Source node 106 and replica node 108 may be separate computers located in the same physical location. Source node 106 and replica node 108 may also be separate computers dispersed over a network of interconnected computers.

Distributed database 104 is a relational database. For example, distributed database 104 includes tables A, B, C, D, E, and F. The tables of distributed database 104 are stored in source node 106 and replica node 108.

The tables stored in source node 106 are source tables. The source tables in source node 106 contain the current data in distributed database 104. As would be appreciated by a person of ordinary skill in the art, the source tables in source node 106 may be stored across a plurality of source nodes. Specifically, each source node of a plurality of source nodes may store a subset of the source tables in distributed database 104 and operate exclusively on that particular subset.

The tables stored in replica node 108 are replica tables. A replica table is a copy of a source table in source node 106. As would be appreciated by a person of ordinary skill in the art, the replica tables may be stored across a plurality of replica nodes.

Database management system 102 may designate one or more source tables stored in source node 106 for replication to replica node 108. Database management system 102 then maintains copies of these designated source tables at replica node 108 as replica tables. For example, database management system 102 replicates tables E and F at source node 106 as tables E' and F' at replica node 108. In other words, tables E' and F' are copies of tables E and F. As would be appreciated by a person of ordinary skill in the art, database management system 102 may replicate all, or a proper subset, of the source tables in source node 106 to replica node 108 depending on usage requirements.

By maintaining replica tables at replica node 108, database management system 102 may distribute read database transactions among the source tables at source node 106 and the replica tables at replica node 108. In other words, database management system 102 can perform load balancing by distributing read database transactions to the replica tables. This may increase overall read database transaction performance for database management system 102 of distributed database 104 by reducing central processing unit (CPU) consumption and table contention at source node 106.

Database management system 102 may submit a read database transaction to either the source tables or replica tables. This is because database management system 102 maintains the state of the source tables in source node 106 with the state of the replica tables in replica node 108.

Database management system 102 must submit a write database transaction to the source tables in source node 106. This is because the source tables in source node 106 contain the current data. Database management system 102 cannot send a write database transaction directly to the replica tables in replica node 108 because the source tables in source node 106 would end up containing outdated data. Specifically, the data in the source tables in source node 106 would become inconsistent with the data in the replica tables in replica node 108.

In order to ensure that the data in the source tables in source node 106 is consistent with the data in the replica tables in replica node 108, database management system 102 replays all write database transactions at the source tables in source node 106 to the corresponding replica tables in replica node 108. This ensures that the data in the replica tables is consistent with the data in the corresponding source tables.

Database management system 102 may replay all write database transactions at the source tables to the corresponding replica tables either synchronously or asynchronously. In synchronous table replication, database management system 102 updates the source table and the corresponding replica table at the same time. In other words, database management system 102 updates the replica table during the same transaction boundary as the source table. This ensures that the replica table will contain the same data as the source table. However, synchronous table replication often increases the write database transaction response time for database management system 102. This is because the replica table is updated by database management system 102 at the same time as the corresponding source table.

In asynchronous table replication, database management system 102 does not update the source table and the replica table at the same time. Rather, database management system 102 may update the replica table after the write database transaction is committed at the source table. This means the replica table may contain outdated data compared to the source table. However, asynchronous table replication often incurs significantly less performance overhead for database management system 102 than synchronous table replication.

While database management system 102 often incurs less performance overhead when performing asynchronous table replication, it often introduces significant delay in table replication. This is because database management system 102 must ensure transactional consistency when replaying write database transactions at the replica table. Specifically, database management system 102 may have to replay write database transactions at the replica table more slowly in order to ensure transactional consistency.

Figure 2:
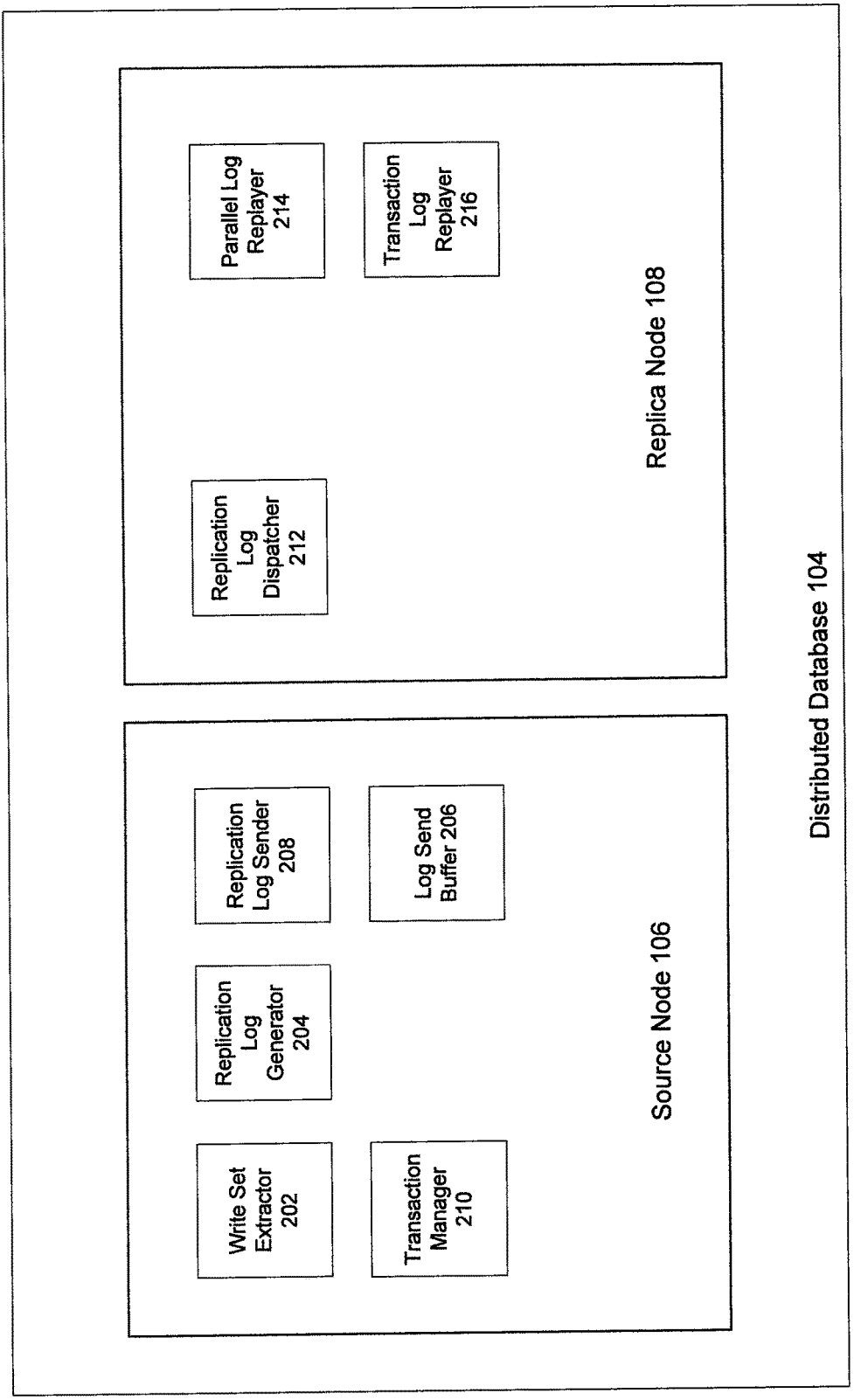
FIG. 2 is a block diagram of a distributed database system with transactional and parallel log replay for asynchronous table replication, according to an example embodiment.

FIG. 2 illustrates a distributed database system with transactional and parallel log replay for asynchronous table replication, according to an example embodiment. This example embodiment for asynchronous table replication minimizes table replication delay by replaying write database transactions in parallel while still ensuring transactional consistency. Specifically, the database management system in this example embodiment replays replication log entries in parallel while serializing the replay of transaction commit log entries.

Figure 3:
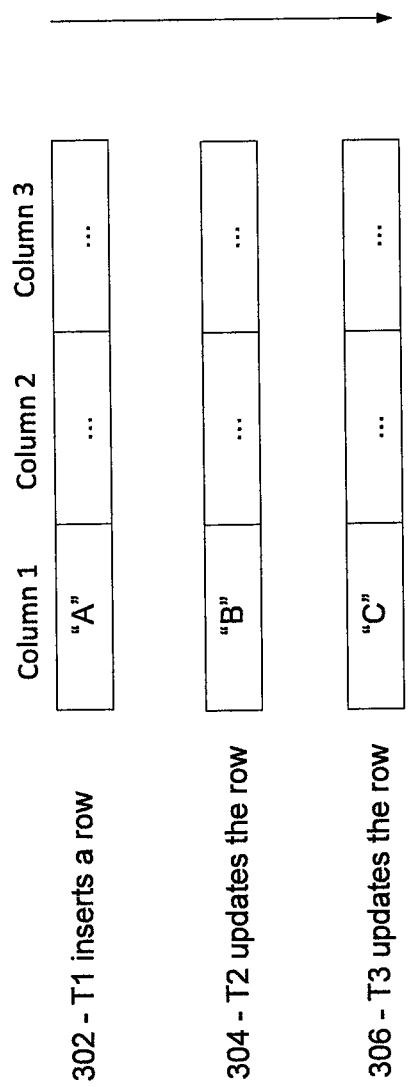
FIG. 3 illustrates an example of ensuring transactional consistency when updating the same row of a replica table, according to the example embodiment described in FIG. 2.

A technical problem with a database management system replaying write database transactions in parallel is ensuring transactional consistency when the transactions update the same row of a replica table in the distributed database. In the example of FIG. 3 for the embodiment of FIG. 2, there are three consecutive write database transactions (e.g. T1, T2, and T3) for the same row at a source table. Transaction T1 is the first transaction and inserts a row at the source table. Transaction T2 is the second transaction and updates the row at the source table. Transaction T3 is the final transaction and also updates the row at the source table.

The database management system must replay these three database write transactions in order at the replica table in order to ensure transactional consistency. For example, if transaction T2 is replayed after transaction T3, the final value of column 1 of the row at the replica table will be "B". However, this would be inconsistent with the value of column 1 of the row at the source table which is "C".

In an example embodiment, a database management system may ensure transactional consistency by replaying database write transactions at the replica node based on table ID. In other words, the database management system may replay a single database write transaction to a replica table at a time. However, if the database management system frequently updates a source table, then the database management system may have to serially replay the database write transactions to the replica table. This may significantly limit the speed by which the database management system may replay database write transactions.

The embodiment in FIG. 2 overcomes this technical problem by creating a row-ID column in the source tables and the replica tables. Specifically, each row in a source table or replica table has a row-ID column. The row-ID column may be of small length. For example, the row-ID column may be 8 bytes in length. However, a person of ordinary skill in the art would appreciate that the row-ID column may be of different length.

In the embodiment in FIG. 2, the database management system increments the value of row-ID column of a row in the source table for a write database transaction to the row. The database management system similarly increments the value of the row-ID column at the corresponding row of the replica table after replaying the write database transaction at the replica table.

The row-ID column value is different than the primary key column value of a row because the value of the row-ID column is incremented when the row is updated. In contrast, the primary key column value is never updated for a row. In other words, the row-ID column value is a change identifier whereas the primary key column value is a row identifier.

In the embodiment in FIG. 2, the database management system may increment the row-ID column value for each write database transaction with minimal performance overhead. This is because of two aspects of the embodiment in FIG. 2.

First, in the embodiment in FIG. 2, the row-ID column value is of small length. Specifically, the row-ID column value may be 8 bytes in length. Because the row-ID column value is of small length, the database management system may increment the row-ID column value using a single atomic hardware instruction. For example, the row-ID column value may be incremented using a compare-and-swap instruction. Because the database management system may perform a single atomic hardware instruction with minimal overhead, the database management system may efficiently increment the row-ID column value.

Second, the database management system may not need to log the incrementing of the row-ID column value because the next row-ID column value can be reset as the maximum value of the available values in the row-ID column. For example, the database management system may reset the row-ID column value as the maximum value of the available values in the row-ID column after a restart of the database management system.

The embodiment in FIG. 2 includes distributed database system 104 from FIG. 1. The tables of distributed database 104 are stored in source node 106 and replica node 108. Source node 106 and replica node 108 are also from FIG. 1.

Source node 106 includes a write set extractor 202, a replication log generator 204, a log send buffer 206, a log sender 208, and a transaction manager 210. Write set extractor 202 extracts the operation type, table ID, transaction ID, the new row image, and row-ID column value for each write database transaction on a row of a source table in source node 106.

The operation type represents the type of write database transaction being performed. For example, the write database transaction could be an insert, update, or delete operation. The table ID is a value that uniquely identifies the table containing the row being updated. The database management system may assign a unique table ID value to each source table.

The transaction ID is a value that uniquely identifies a write database transaction to be performed by the database management system. The transaction ID allows the database management system to ensure the order in which write database transactions are performed. For example, a write database transaction with a transaction ID of 101 must be performed before a write database transaction with a transaction ID of 102 for the same given row. Otherwise the row will contain inaccurate data.

Replication log generator 204 generates a replication log entry for a changed row of a source table. Specifically, the replication log entry may contain the operation type, table ID, transaction ID, the new row image for the changed row as extracted by the write set extractor 202. In addition, the replication log entry may contain one or more row-ID column values.

For an insert operation, a replication log entry contains the new row-ID column value of the inserted row. For an update operation, a replication log entry contains the old row-ID column value of a row before the update operation and the new row-ID column value after the update operation is completed. For a delete operation, a replication log entry contains the old row-ID column value of the row to be deleted before the delete operation is completed. As would be appreciated by a person of ordinary skill in the art, a replication log entry may be represented and stored in various ways.

Replication log generator 204 appends a generated replication log entry to log send buffer 206. Log send buffer 206 stores replication log entries and transaction commit log entries.

Log sender 208 send replication write log entries and transaction commit log entries in log send buffer 206 to replica node 108. For example, where source node 106 and replica node 108 are connected over a computer network, log sender 208 sends replication log entries in log send buffer 206 to replica node 108 over the computer network.

In order to ensure transactional consistency at the source tables of source node 106, transaction manager 210 performs a transaction commit operation to apply a write database transaction to the source tables. In addition, transaction manager 210 creates a transaction commit log entry when the write database transaction is committed by transaction manager 210 to the source tables.

A transaction commit log entry includes the transaction ID of the committed write database transaction. Transaction manager 210 appends a transaction commit log entry to the log send buffer 206. Log sender 206 sends the transaction commit log entry in log send buffer 206 to replica node 108 to apply the committed write database transaction to the replica tables.

At replica node 108, replication log receiver and dispatcher 212 receives replication log entries and transaction commit log entries from source node 106. Replication log receiver and dispatcher 212 dispatches a received log entry to parallel log replayer 214 or transaction log replayer 216 depending on the type of log entry.

If the received log entry is a replication log entry, replication log receiver and dispatcher 212 dispatches the replication log entry to the parallel write log replayer 214. Parallel log replayer 214 may include multiple queues, and each queue may be assigned a replication log entry for replay. Parallel log replayer 214 may replay the replication log entries assigned to each queue simultaneously in parallel. By replaying the replication log entries in parallel, parallel log replayer 214 may minimize the table replication delay between source node 106 and the replica node 108.

Moreover, parallel log replayer 214 may replay two replication log entries for the same replica table in parallel. This is possible because transaction log replayer 216 replays transaction commit log entries serially as discussed below.

If the received log entry is a transaction commit log entry, replication log receiver and dispatcher 212 dispatches the transaction commit log entry to the transaction log replayer 216. This is necessary in ensure transactional consistency during the parallel replay of replication log entries by parallel log replayer 214.

The embodiment of FIG. 2 ensures transactional consistency during the parallel replay of replication log entries by parallel log replayer 214 by enforcing two conditions. First, the result of the replay of a replication log entry may only become visible at a replica table after the corresponding transaction commit log entry is replayed. In other words, the database management system must replay the corresponding transaction commit log entry before the changes made at the source tables are actually persisted at the replica tables. Second, replication log entries may be replayed in parallel independently of their execution order at the source table but transaction commit log entries must be replayed in exactly the same order as they were performed at the source tables.

The embodiment of FIG. 2 ensures these two conditions are satisfied by replaying transaction commit log entries serially at transaction commit replayer 216 and replaying replication log entries in parallel at parallel log replayer 214 based on their row-ID column values. Specifically, parallel log replayer 214 replays a replication log entry for an update or delete operation after its old row-ID column value is visible in the replica table. This ensures that the second one of two conflicting write database transactions to the same row is replayed only after its preceeding write database transaction is replayed and committed. This is because the result of the first write database transaction, including the row-ID column value update, becomes visible at the replica table after the first write database transaction is committed. And the first write database transaction is committed when the transaction log replayer replays a transaction commit log entry for the same transaction ID as the first write database transaction. If parallel log replayer 214 replays the replication log entry subject to this condition, the row-ID column value of the row in the replica table is updated with the new row-ID column value included in the replication log entry (in case of an update log entry).

Because this embodiment in FIG. 2 performs row-ID column value based dynamic detection of conflicting write sets, replication log entries can be freely dispatched by replication log receiver and dispatcher 212 to multiple queues at parallel log replayer 214 without any restriction. In particular, replication log receiver and dispatcher 212 can dispatch the replication log entries without performing table-level serialization. This may significantly accelerate the replication log replay performance, which also will reduce the visibility gap between the source tables and replica tables under asynchronous table replication.

Figure 4:
FIG. 4 illustrates an example of ensuring transactional consistency during parallel log replay, according to the example embodiment described in FIG. 2.

FIG. 4 illustrates an example of how the embodiment in FIG. 2 ensures transactional consistency during parallel log replay. Specifically, FIG. 4 includes four write database transactions (e.g. T1, T2, T3, and T4) to the same row at a replica table. These four write transactions are to be replayed by the embodiment described in FIG. 2. The row in the replica table includes a primary key column, a column 1, and a row-ID column.

With respect to transaction T3, its replication log entry cannot be replayed before transaction T2's replication log entry even though they both are potentially capable of being replayed in parallel by parallel log replayer 214. This is because transaction T3's replication log entry includes "r2" as its old row-ID column value and "r3" as its new row-ID column value. Therefore, transaction T3 must wait to be replayed until the row-ID column value of "r2" is visible for the row in the replica table. And this possible only after transaction T2's replication log entry is replayed and committed to the replica table.

Similarly, transaction T4's replication log entry can be replayed only after transaction T3's replication log entry is replayed and committed. This is because transaction T4's replication log entry represents a delete operation. Specifically, transaction T4's replication log entry includes "r3" as its old row-ID column value. Therefore, transaction T4 must wait to be replayed until the row-ID column value of "r3" becomes visible for the row in the replica table.

FIG. 5 illustrates an example of how data integrity is ensured during parallel log replay, according to the embodiment described in FIG. 2. Specifically, FIG. 2 includes three write database transactions (e.g. T1, T2, and T3) to be replayed by the embodiment described in FIG. 2. In FIG. 5, the rows in the replica table include a primary key column, a column 1, and a row-ID column.

With respect to transaction T3, its replication log entry can be replayed by parallel log replayer 214 before transaction T2 because transaction T3's insert replication log entry does not have any old row-ID column value and it does not violate any write set conflict rules. Nor does transaction T3's insert replication log entry violate any uniqueness constraint, e.g. each row having a unique primary key column value, assuming the primary key column was checked by the database management system at the source table). This is not an issue because the result of replaying transaction T3's insert replication log entry will not be visible until transaction T3's transaction commit log entry is replayed by transaction log replayer 216, and transaction T3's transaction commit log entry will be replayed by transaction log replayer 216 only after the transaction commit log entries of transactions T1 and T2 are replayed. Therefore, the embodiment of FIG. 2 ensures data integrity during parallel log replay.

Another technical problem with the embodiment in FIG. 2 is the possibility of a deadlock during parallel log replay. However, the possibility of a deadlock during parallel log replay is eliminated by combining the embodiment in FIG. 2 with an embodiment of a two-phase locking protocol at the source table. Specifically, the embodiment of a two-phase locking protocol at the source table ensures that the locks held on the changed data set at the source table can be released only after the associated database transaction is committed.

Figure 6:
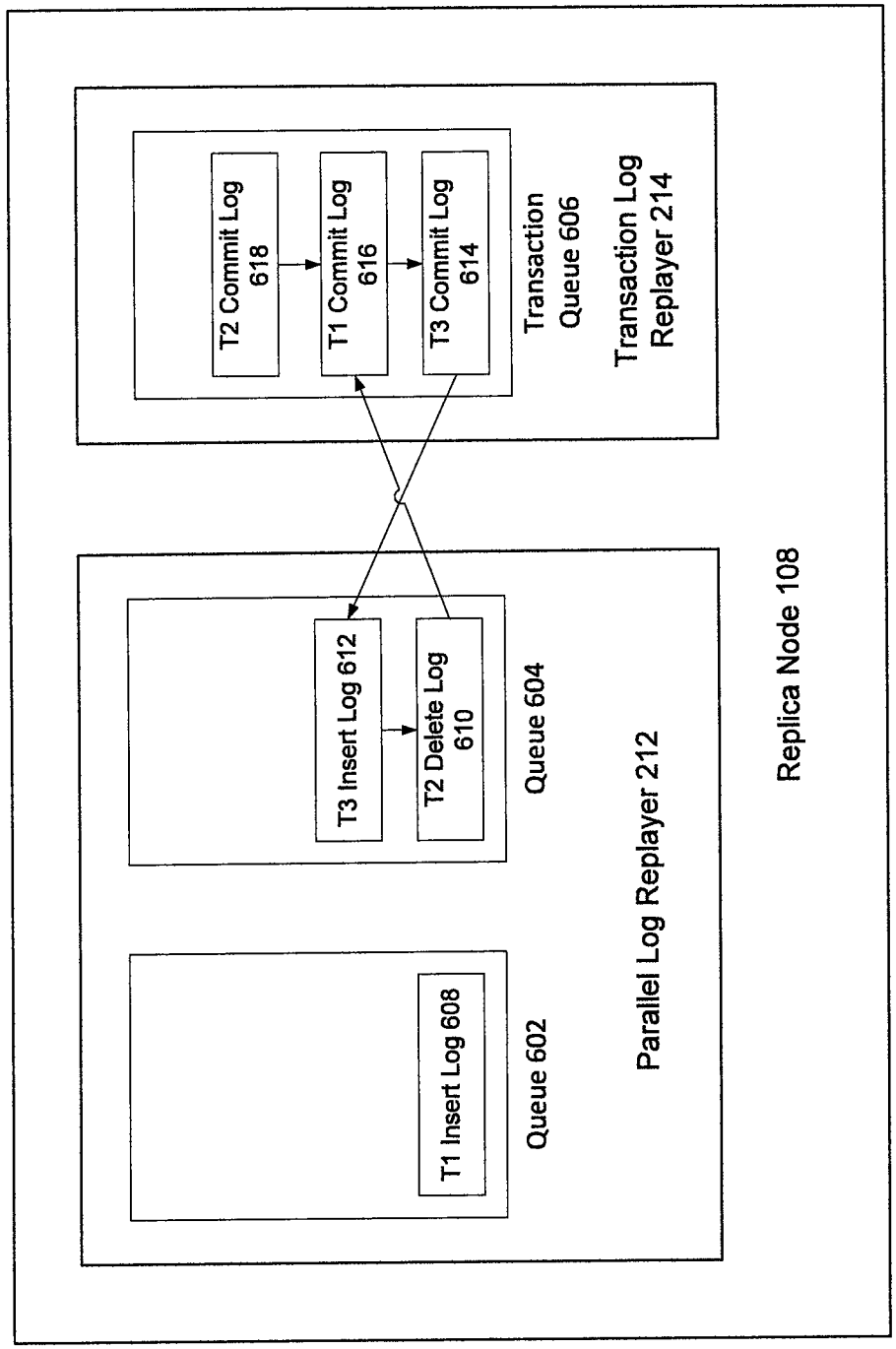
FIG. 6 illustrates an example of a deadlock during parallel log replay, according to the example embodiment described in FIG. 2.

FIG. 6 illustrates a deadlock involving the same example illustrated in FIG. 5. FIG. 6 includes replica node 108 from the embodiment in FIG. 1 and parallel log replayer 212 and transaction log replayer 214 from the embodiment in FIG. 2. Parallel log replayer 214 includes queues 602 and 604 which store one or more replication log entries for replay. Transaction log replayer 216 includes transaction queue 606 which stores one or more transaction commit log entries.

In FIG. 6, database transaction T1's insert replication log entry 608 is added to queue 602 of parallel log replayer 212. Database transaction T2's delete replication log entry and database transaction T3's insert replication log entry are added to queue 604 of parallel log replayer 212. Transaction queue 606 is ordered as T3's transaction commit log entry 614, T1's transaction commit log entry 616, and T2's transaction commit log entry 618. This creates a deadlock because there is a cyclic wait for dependency among the database transactions.

Specifically, T2's delete replication log entry 610 in queue 604 will wait for the replay of T1's transaction commit log entry 616 because the old row-ID column value for T2's delete replication log entry 610 must be become visible at the replica table first. T3's insert replication log entry 612 in queue 604 will wait for T2's delete replication log entry 610 to be replayed first because its in the same queue. T3's transaction commit log entry 614 will wait for the replay of T3's insert replication log entry. T1's transaction commit log entry 616 will wait for T3's transaction commit log entry 614 to be replayed first because its in the same queue.

However, this scenario is impossible because the following two rules are kept by the combination of this embodiment and an embodiment for a two-phase locking protocol. Specifically, a transaction commit log entry cannot be replayed by transaction log replayer 214 before its replication write log entry is replayed by parallel log replayer 212. Second, if any two replication log entries have a common write set, then the second replication log entry cannot be replayed before the first replication log entry's corresponding transaction commit log entry. Thus, because these conditions cannot hold at the same time in the example of FIG. 6, there can be no deadlock.

Figure 7:
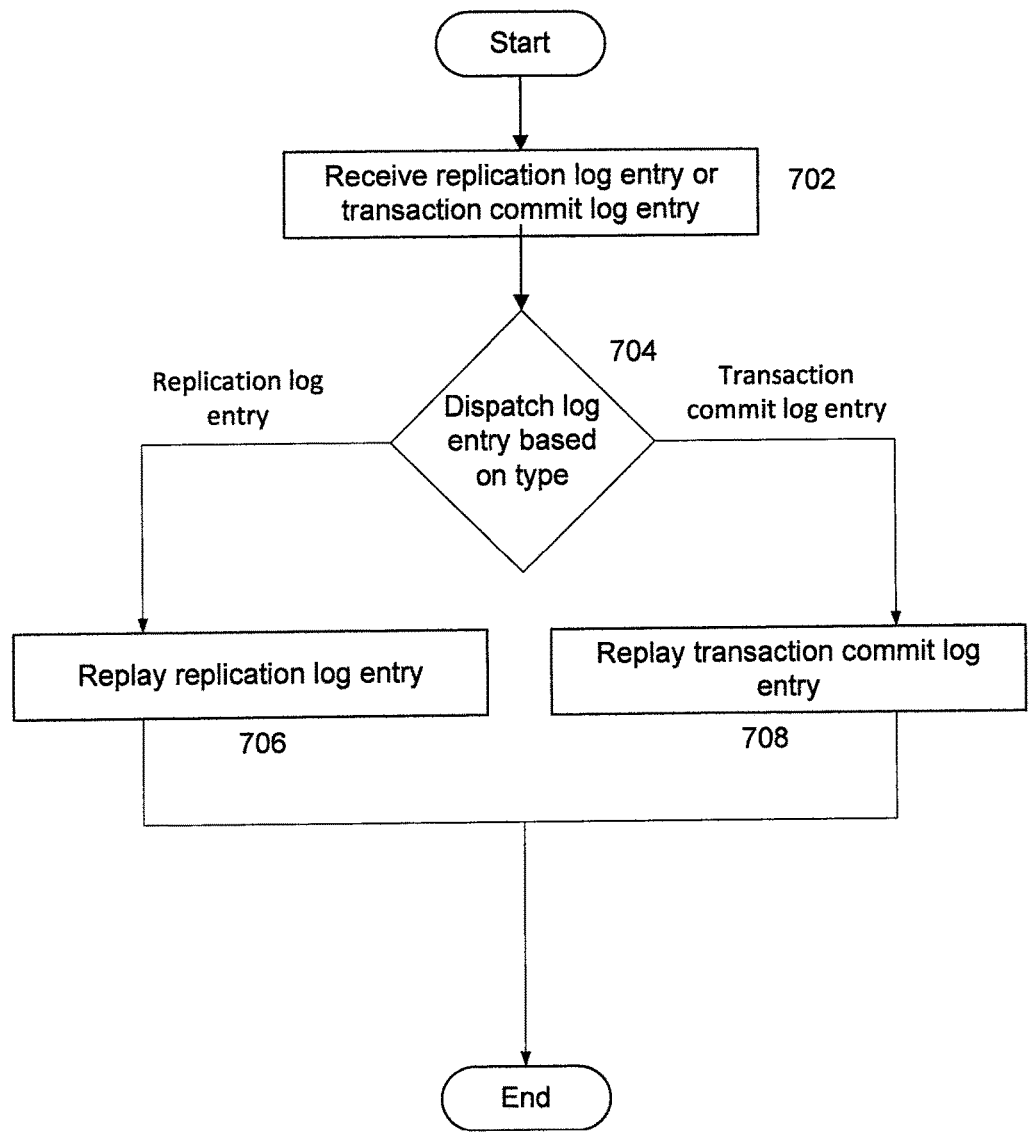
FIG. 7 is a flowchart illustrating a process for transactional and parallel log replay, according to an example embodiment described in FIG. 2.

FIG. 7 is a flowchart for a method 700 for transactional and parallel log replay, according to an embodiment. Method 700 is described with reference to FIG. 2. Method 700 can be performed by processing logic that can comprise hardware (e.g., circuitry, dedicated logic, programmable logic, microcode, etc.), software (e.g., instructions run on a processing device), or a combination thereof.

In step 702 of FIG. 7, replication log receiver and dispatcher 212 at replica node 108 of FIG. 2 receives a replication log entry or transaction commit log entry from source node 106. The replication log entry includes the operation type, table ID, transaction ID, the new row image, and one or more row-ID column values representing the associated write database transaction. The transaction commit log entry includes a transaction ID that represents a write database transaction that the database management system committed to the corresponding source table in source node 106.

In step 704 of FIG. 7, replication log receiver and dispatcher 212 determines the type of log entry received in step 702. Specifically, replication log receiver and dispatcher 212 determines whether the log entry is a replication log entry or transaction commit log entry. If the type of log entry received is a replication log entry, then step 706 is performed. If the type of log entry received is a transaction commit log entry, then step 708 of FIG. 7 is performed.

In step 706 of FIG. 7, replication log receiver and dispatcher 212 dispatches the replication log entry to parallel log replayer 214 for replay. Parallel log replayer 214 may comprise multiple queues, and the replication log entry may be assigned to a queue among the multiple queues for replay. Parallel log replayer 214 replays the replication log entry assigned to the queue once any previous replication log entries in the queue have been replayed. As discussed above, parallel log replayer 214 may replay multiple replication log entries in parallel, one assigned to each queue. As would be appreciated by a person of ordinary skill in the art, parallel log replayer 214 may replay the replication log entries in parallel by assigning a thread of execution for replay of each replication log entry.

Parallel log replayer 214 replays the replication log entry subject to the transactional guarantees discussed above. Specifically, parallel log replayer 214 replays an update or delete replication log entry after its old row-ID column value is visible in the replica table. This ensures that the second one of two conflicting write transactions to be replayed to the same row is replayed only after the first write database transaction is replayed and committed. This is because the result of first write transaction, including the update of row-ID column value, becomes visible at the replica table after the first write transaction is committed. And the first write database transaction is committed when transaction log replayer 216 replays a transaction commit log entry for the same transaction ID as the first write database transaction. In the case of an update operation, if replaying the replication log entry satisfies this condition, the row-ID column value of the row in the replica table is updated with the new row-ID column value included in the replication write log entry.

In step 710 of FIG. 7, replication log receiver and dispatcher 212 dispatches the transaction commit log entry to transaction log replayer 216 for replay of the transaction commit operation. Specifically, by replaying the transaction commit operation for the transaction ID in the transaction commit log entry, transaction log replayer 216 commits the associated write database transaction corresponding to a replication log entry that has been replayed by parallel log replayer 214 to the replica table.

As discussed above, transaction log replayer 216 replays the transaction commit log entries serially. In order words, transaction log replayer 216 may process transaction commit log entries using a single queue. This is done to ensure transactional consistency at the replica node. Moreover, transaction log replayer 216 replays transaction commit log entries independently and simultaneously with the replication log entries being replayed by parallel log replayer 214.

A technical problem with table replication occurs when there is a restart of the database management system at the source node or replica node. A restart may be required because of a crash of the source node or replica node. But when there is a restart due to a crash or node failure, there may exist not yet replicated changes from the source tables to the corresponding replica tables. This is especially true in asynchronous table replication because the table replication take place after the write database transaction commits at the source table. In order for distributed read transactions to return current and accurate data from the source or replica tables, the database management system must be able to detect such lost replication change as well as resynchronize the replica tables with the corresponding source tables.

In an example embodiment for lost change detection and resynchronization, the database management system maintains a persistent replication log queue at the source node. The database management system then iterates the persistent replication log queue when restarting after a crash or node failure to find out if there is any lost data, e.g. data not replicated). Specifically, the database management system checks the persistent replication log queue and determines which replication log entries are presents and collects them. The database management system then sends the collected replication log entries to the replica node for replay.

This example embodiment for lost change detection and resynchronization proceeds as follows. First, the database management system captures any changes (e.g. write database transactions) to the source table at the source node. This may performed by write set extractor as discussed above. For example, the database management system may capture write database transactions such as an insert, update, or delete operation.

Second, the database management system stores the captured changes as replication log entries in the persistent replication log queue. While the database management system may store the replication log entries in the persistent replication log queue, the captured changes may not have been committed to the source table by the database management system.

Third, if database management system commits the database transaction associated with the replication log entry to the source table by performing a transaction commit operation, the database management system makes the corresponding replication log entry in the persistent replication log queue persistent. In other words, even if the database management system crashes or the source node fails, the replication log entry is recoverable from the persistent replication log queue upon restart.

Fourth, the database management system propagates the replication log entry and the transaction commit log entry to the replica node as discussed above, e.g. using the log send buffer. The database management system removes the replication log entry or transaction commit log entry from the persistent replication log queue upon propagation.

Fifth, the database management system replays the replication log entry and transaction commit log entry on the corresponding replica table at the replica node as discussed above.

Because the replicated log entries are stored persistently in the persistent replication log queue at the source node, if there is a crash or node failure, any lost change that was not replicated by the database management system to the replica node can be detected by checking the persistent replication log queue. Moreover, the replica node can be resynchronized by iterating over the replication log entries persistently stored in the persistent replication log queue and propagating those replication log entries to the replica node.

While the above method can detect lost change and resynchronize the replica tables, there is often high overhead to the database management system in maintaining the persistent replication log queue. Moreover, if there is a crash between third and fourth steps above, the replica node will not receive the replication log entries resulting in data loss.

In order to overcome these technical problems, an example embodiment uses a row-ID column value based lost change detection and resynchronization protocol. Specifically, this embodiment can use the same row-ID column value described in with respect to the embodiment in FIG. 2. By using the same row-ID column described above, a persistent replication log queue becomes unnecessary for lost change detection and resynchronization and may be eliminated. This eliminates the high overhead to the database management system in maintaining the persistent replication log queue.

In this embodiment, instead of a persistent replication log queue, if there is restart due a crash or node failure, lost change detection and resynchronization can be performed by the database management system by comparing the source table to the replica table using the row-ID column values and determining which replication log entries were not replayed.

More specifically, this embodiment includes source and replica tables having row-ID columns like the embodiment in FIG. 2. During a crash or node failure, the database management system restarts. During the restart, the database management system compares the row-ID column values of the source table to the row-ID column values of the corresponding replica table. If the database management system detects a mismatch of row-ID column values between the source and replica tables, the database management system identifies a lost change. The database management system can resolve the lost change by resending the corresponding row from the source table or by deleting the corresponding row at the replica table.

In this embodiment, the database management system resolves a mismatch of row-ID column values between source and replica tables according to three cases. First, if the database management system find the same row-ID column value for a row at the both the source and replica tables, the database management does not have to perform any resynchronization because the tables are consistent. Second, if the database management system finds the row-ID column value for a row only at the source table, the database management system resends the corresponding row from the source table to the replica table. Finally, if the database management system finds the row-ID column value for a row only at the replica table, the database management system deletes the row from the replica table.

FIG. 8 illustrates an example of how row-ID based lost change detection and resynchronization works, according to the embodiment. Specifically, FIG. 8 includes a source table 802 and replica table 804 that are setup for asynchronous table replication by the embodiment described in FIG. 2. Both source table 802 and replica table 804 include a row-ID column as described by the embodiment in FIG. 2. Both source table 802 and replica table 804 include a primary key column, a column 1 containing a data value, and a row-ID column.

In the example of FIG. 8, the row-ID based lost change detection and resynchronization embodiment applies the above mismatch rules after a restart operation. For example, the database management system will compare the row-ID column value set of source table 802 (e.g. r1, r3, r5, r9) with the row-ID column value set of replica table 804 (e.g. r1, r2, r4, r8). For row 1 at source table 802, the row-ID column value of r1 is found at both at source table 802 and replica table 804 so there is nothing for the database management system to do. For row 2 at source table 802, the row-ID column value of r3 is found only at source table 802. Similarly, for rows 3 and 4 at source table 802, the row-ID column values of r5 and r9 are found only at source table 802. Therefore, the database management system must reinsert rows 2, 3, and 4 from source table 802 to replica table 804.

For row 2 at replica table 804, the row-ID column value of r2 is found only at replica table 804. Similarly, for rows 3 and 5 at replica table 804, the row-ID column values of r4 and r8 are found only at replica table 804. Therefore, the database management system must delete rows 2, 3, and 5 at replica table 804. As a result, both source table 802 and replica table 804 will be synchronized by the database management system.

This embodiment can therefore detect lost change and resynchronize the lost change without maintaining any persistent replication log queue. However, the database management system pays a performance penalty in comparing the row-ID column values of the source table with the row-ID column values of the replica table.

Table comparison is often very expensive in terms of CPU time for the database management system. However, this embodiment's usage of a row-ID column may table comparison inexpensive for the database management system. This is because of several reasons. First, the row-ID column value is on every row of a table. Second, the row-ID column value can already propagated to the replica table in form replication log entries as discussed in the embodiment in FIG. 2. Third, the database management system only has to compare the row-ID comparison values during comparison of the source and replica tables.

Fourth, the comparison is performance inexpensive for the database management system where the database is a column-oriented database. This is because only the row-ID column needs to be compared and a column-oriented database management system only needs to scan the relevant column (e.g. row-ID column) when performing an operation. This is in contrast to a row-oriented database management system which must scan the columns of the rows it is reading. In other words, column oriented storage minimizes overhead because it's quite fast to extract values (e.g. row-ID column values) of only a specific column in a table.

Finally, performing table comparison according to this embodiment does not create significant overhead for the database management system because a replication restart happens very rarely. Specifically, a replication restart being performed by the database management system according to this row-ID embodiment is rare because it is triggered on a node restart or after a node enters into an exceptional state. Therefore, it is better to optimize the common case (e.g. reducing the run-time overhead by removing a persistent replication log queue) by adding reasonable overhead to a rare case (e.g. node restart or node enters in an exceptional state).

Figure 9:
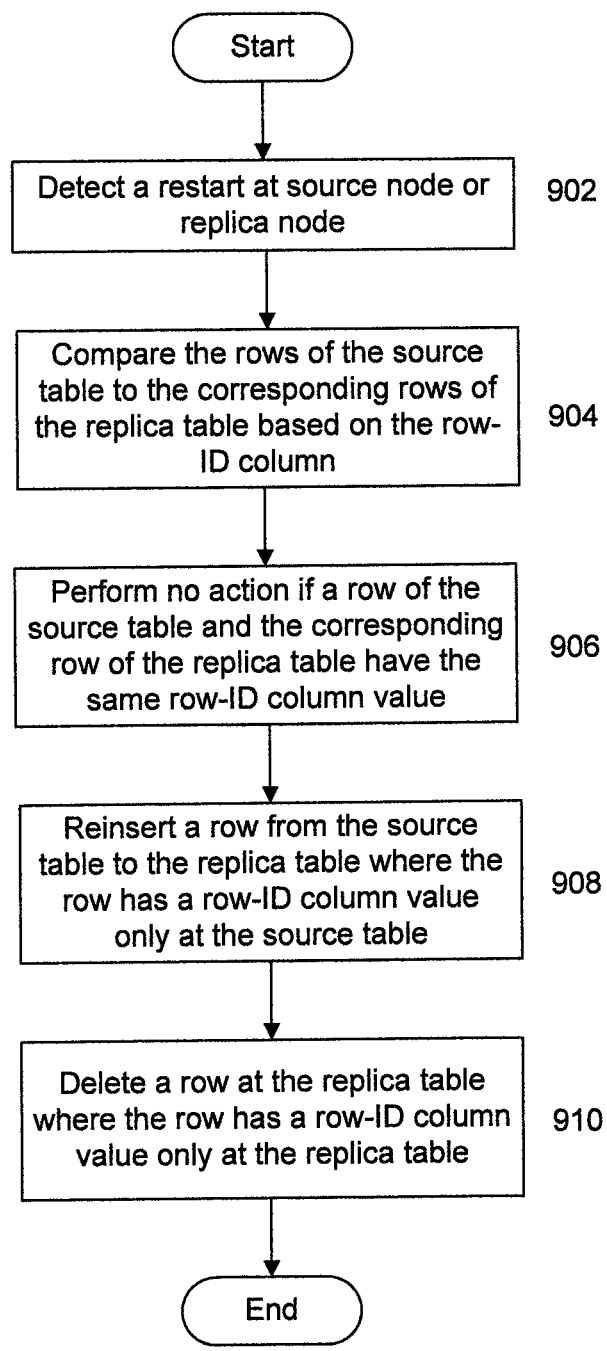
FIG. 9 is a flowchart illustrating a process for row-ID based lost change detection and resynchronization, according to an example embodiment.

FIG. 9 is a flowchart for a method 900 for row-ID based lost change detection and synchronization, according to an embodiment. Method 900 can be performed by processing logic that can comprise hardware (e.g., circuitry, dedicated logic, programmable logic, microcode, etc.), software (e.g., instructions run on a processing device), or a combination thereof.

In step 902 of FIG. 9, the database management system detects a restart at either the source node or replica node. For example, the database management system may detect that the source node or replica node crashed.

In step 904 of FIG. 9, the database management system compares the row-ID column value of each row at the source table to the corresponding row-ID column value of the corresponding row at the replica table.

In step 906 of FIG. 9, if the database management system finds the same row-ID column value at a row in the source table and the corresponding row in the replica table, the database management system will perform no action.

In step 908 of FIG. 9, if the database management system finds a row-ID column value for a row only at the source table, the database management system will reinsert the row from the source table to the replica table. As would be appreciated by a person of ordinary skill in the art, the database management system may perform this reinsertion according to various methods.

In step 910 of FIG. 9, if the database management system finds a row-ID column value for a row only at the replica table, the database management system will delete the row at the replica table.

Another technical problem with lost change detection and re-synchronization is that it can happen while the database management system is accepting new write database transactions at the source table. More specifically, if there are any incoming writes at the source table during lost change detection and re-synchronization, the incoming changes and existing lost change become mixed. This is a problem because the database management system cannot determine the ordering of these changes.

In an example embodiment for synchronizing incoming write database transactions during lost change detection and resynchronization, the database management system can lock the source table until the lost change and resynchronization is complete. However, this is often disruptive for a heavily utilized database management system because the database becomes unavailable to users for updating (at least with respect to the locked table).

This database unavailability limitation can be overcome in another example embodiment for lost change detection and re-synchronization. Specifically, in this embodiment, the database management system can perform the lost change detection and resynchronization with minimal table locking. This embodiment can also accept incoming updates to a source table undergoing lost change detection and resynchronization by the database management system. While this embodiment performs table locking, it is very minimal compared to the above example embodiment.

In order minimize table locking during lost change detection and resynchronization, this embodiment uses a snapshot isolation protocol so the database management system does not have to completely rely on table locking to block incoming writes to the database. Specifically, the database management system treats the lost change detection and resynchronization operation as a database transaction. In other words, the database management system assigns the lost change detection and resynchronization operation a transaction ID like any other database transaction. Moreover, like any other database transaction, the lost change detection and resynchronization operation is assigned a timestamp when the database management system performs it.

Figure 10:
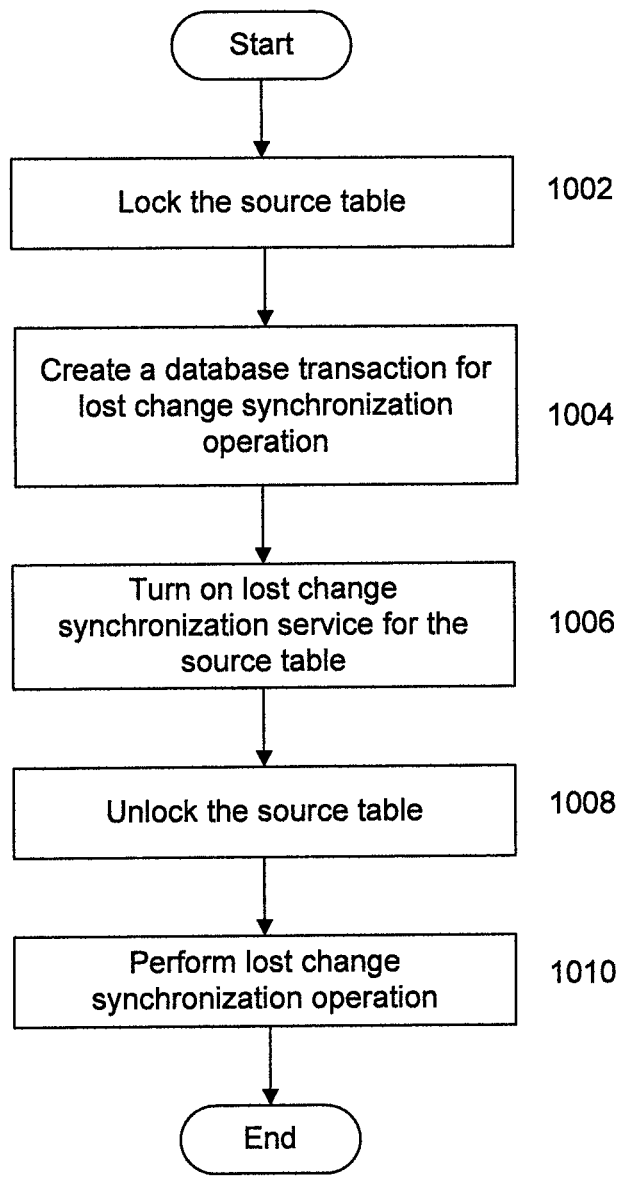
FIG. 10 is a flowchart illustrating a process for minimizing table locking during lost change detection and resynchronization, according to an example embodiment.

FIG. 10 is a flowchart for a method 1000 for minimizing table locking during lost change detection and resynchronization, according to the embodiment above. Method 1000 can be performed by processing logic that can comprise hardware (e.g., circuitry, dedicated logic, programmable logic, microcode, etc.), software (e.g., instructions run on a processing device), or a combination thereof.

In step 1002 of FIG. 10, the database management system locks the source table to be checked for lost change detection and resynchronization. In other words, the database management system blocks all write database transactions to the source table.

In step 1004 of FIG. 10, the database management system creates a database transaction for the lost change detection and resynchronization operation. In addition, and as a result of creating this database transaction, the database management system also assigns a timestamp to the database transaction. The timestamp represents the time point at which the transaction started. This means that all previous write database transactions before this time point will be visible to the lost change detection and resynchronization transaction. The database management system can thereby use the timestamp of the lost change and resynchronization transaction to distinguish which incoming data changes from existing data changes.

In step 1006 of FIG. 10, the database management system switches on the lost change detection and resynchronization service for the source table. In other words, once the source table is unlocked, all newly incoming write database transactions to the source table will be replicated to the replica node according to the chosen table replication embodiment. For example, this may be asynchronous table replication according to the embodiment in FIG. 2.

In step 1008 of FIG. 10, the database management system unlocks the source table. At this point the database management system can send any write database transaction to the source table again. Steps 1002 to 1008 represent the only period of time when the source table must be locked in this embodiment.

In steps 1010 of FIG. 10, the database management system performs the row-ID lost change detection and resynchronization embodiment described above for the source table. In other words, the database management system compares the row-ID column values of the source table with that of the replica table. In order to ensure data consistency, the database management system performs this comparison based on the transaction visibility given by the transaction timestamp assigned to the lost change and resynchronization database transaction at step 1004. Specifically, the database management system performs the database transaction with a smaller timestamp first.

In step 1012 of FIG. 10, the database management system perform the mismatch rules of the row-ID based lost change and resynchronization embodiment.

Because the lost change and resynchronization operation is treated as a database transaction, and therefore has a timestamp, steps 1010 and 1012 may overlap with incoming write database transactions to the source table. In other words, the lost change and resynchronization operation is performed independently of the incoming write database transactions to the source table.

In practice, the majority of the execution time for the database management system is during step 1010 of the above embodiment. Therefore, by reducing the table lock duration to only steps 1002 to 1008, the source table can accept new incoming write database transactions non-disruptively even during the lost change detection and re-synchronization time period.

Figure 11:
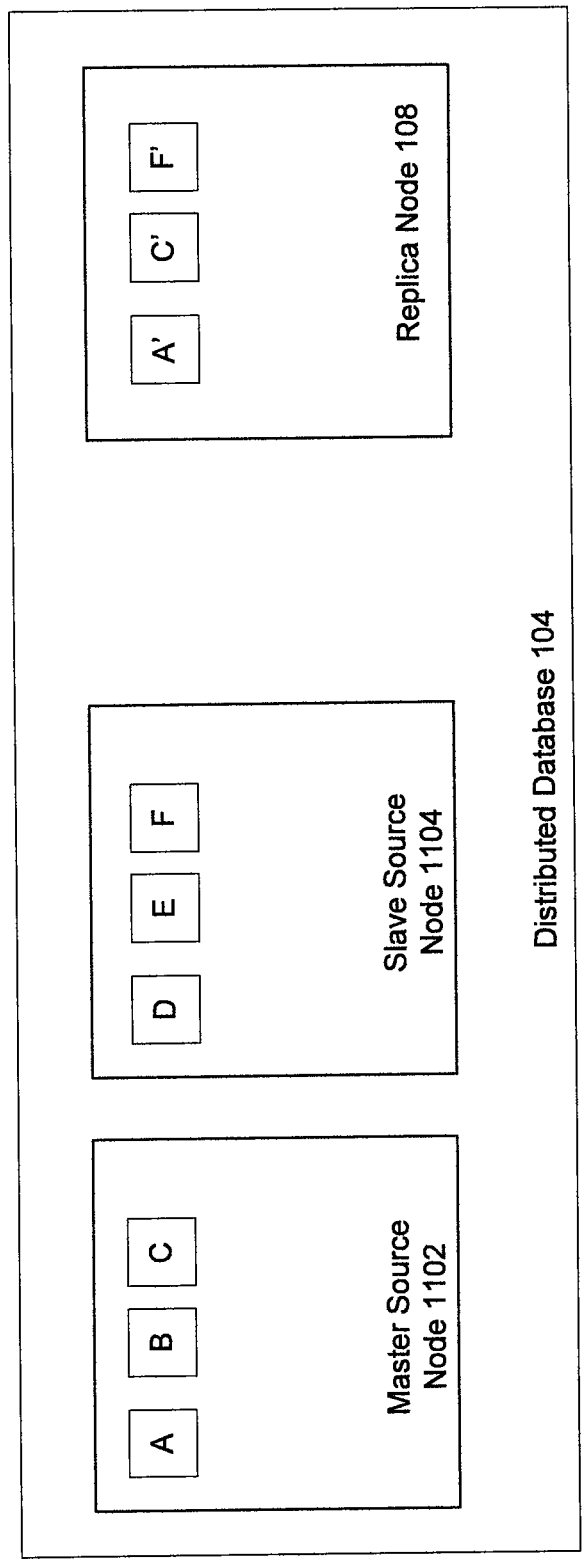
FIG. 11 is a block diagram of a distributed database system supporting replication from distributed source tables with transactional and parallel log replay, according to an example embodiment

FIG. 11 illustrates a database management system supporting replication from distributed source tables with transactional and parallel log replay, according to an example embodiment. FIG. 11 includes master source node 1102, slave source node 1104. FIG. 11 also includes replica node 108 from the embodiment in FIG. 2. Master source node 1102 and slave source node 1104 represent source nodes as described in the embodiment of FIG. 2. Replica node 108 represents a replica node as described in the embodiment of FIG. 2.

In contrast to the embodiment of FIG. 2, the embodiment of FIG. 11 has multiple source nodes (e.g. master source node 1102 and slave source node 1104). In other words, the embodiment of FIG. 11 supports table replication from distributed source tables. In a distributed source table architecture, the source tables are distributed across a master source node 1102 and one or more slave source nodes 1104. For example, in FIG. 11, tables A, B, and C are stored at the master source node 1102 and tables D, E, and F are stored at slave source node 1104. Both master source node 1102 and slave source node 1104 exclusively manage and contain the original data of their source tables.

As discussed above with respect to the embodiment of FIG. 2, replica node 108 contains copies of the sources tables designated for replication by the database management system. For example, in FIG. 11, tables A and C at master source node 1102 are designated for replication to replica node 108. Similarly, table F at slave source node 1104 is designated for replication by the database management system to replica node 108. Source tables B, D, and E are not designated for replication by the database management system in FIG. 11. Therefore, they are only stored at either master source node 1102 or slave source node 1104.

A common problem with table replication using distributed source tables is deadlock. Specifically, with respect to the embodiment of FIG. 11, the database management system cannot ensure that a transaction commit log entry comes after its associated replication log entry for a write database transaction. This may create a deadlock at the parallel log replayer at the replica node.

This ordering constraint cannot be ensured because the database management system sends all transaction commit log entries to the replica node 108 from master source node 1102. In contrast, the database management system sends replication log entries directly to replica node 108 from either master source node 1102 or slave source node 1104. Because this ordering constraint cannot be ensured by the database management system, it is possible to have a deadlock situation at the parallel log replayer at replica node 108 as described with respect to FIG. 6.

In an example embodiment, a deadlock can be avoided by having the database management system ensure that a transaction commit log entry at the master source node 1102 is sent to replica node 108 only after the associated replication write log entry is generated at master source node 1102 or slave source node 1104. In other words, the database management system enforces the above ordering constraint at the source nodes. However, performing this cross node synchronization adds complexity to the database management system and creates table replication delay.

Figure 12:
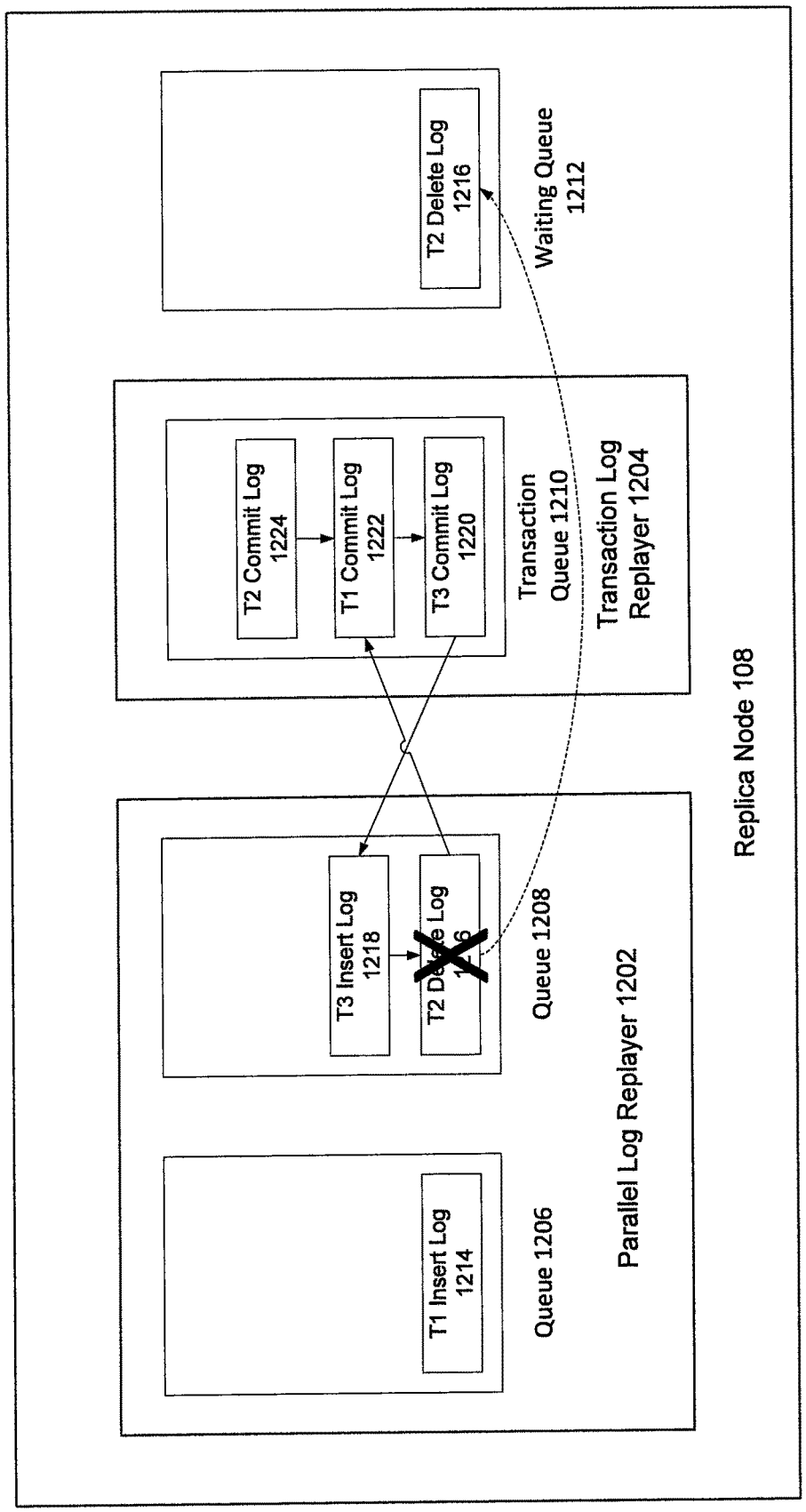
FIG. 12 illustrates an example of avoiding a deadlock in distributed database system supporting replication from distributed source tables with transactional and parallel log replay, according to the example embodiment described in FIG. 11.

FIG. 12 illustrates an example embodiment for dynamically resolving deadlock by log forwarding. Specifically, this embodiment enforces the ordering constraint above at the replica node instead of at the source nodes. As a result, this embodiment avoids a deadlock at the parallel log replayer at replica node 108 while still allowing out-of-order replication log entry propagation to replica node 108. Specifically, this embodiment adds a waiting queue at replica node 108. By having a designated spare queue at replica node 108, the deadlock described above in FIG. 6 can be resolved by forwarding any waiting replication log entries to the waiting queue.

FIG. 12 includes replica node 108. Replica node 108 includes parallel log replayer 1202, transaction log replayer 1204, and waiting queue 1212. Parallel log replayer 1202 includes queue 1206 and queue 1208. Queues 1206 and 1208 include one or more replication log entries which are replayed by the parallel log replayer 1202 in parallel.

Transaction log replayer 1204 includes transaction queue 1210. Transaction queue 1210 includes one or more transaction commit log entries which are processed serially by transaction log replayer 1204 in order to ensure transactional consistency at replica node 108.

Waiting queue 1212 is contains forwarded replication log entries. Waiting queue 1212 enables this embodiment to avoid a deadlock at parallel log replayer 1202. Specifically, if the database management system detects a deadlock at parallel log replayer 1202, the database management system forwards a replication log entry from one of queues 1206 and 1208 to the waiting queue 1212 based on whether removing the replication log entry from the queue 1206 or 1208 resolves the deadlock. The database management system continues to forward replication log entries to the waiting queue 1212 until the deadlock is removed.

As would be appreciated by a person of ordinary skill in the art, the database management system may detect a deadlock situation at parallel log replayer 1202 in many different ways. For example, the database management system may detect one or more dependencies between database transaction that will lead to a deadlock based on transaction ID. In addition, a person of ordinary skill in the art would appreciate that deadlock detection may be performed on demand. For example, the database management may check for a deadlock when replay at parallel log replayer 1202 becomes blocked.

FIG. 12 illustrates an example of how this embodiment avoids a deadlock at parallel log replayer 1202. In FIG. 12, transaction T3's transaction commit log entry is to be replayed before transaction T3's replication log entry to insert a row. But transaction T3's transaction commit log entry cannot be replayed until T3's insert replication log entry is replayed.

Moreover, T3's insert replication log entry must wait for T2's delete replication log entry to be replayed by parallel log replayer 1202 because they are in the same queue 1208. And T2's delete replication log entry cannot be replayed until T1's transaction commit log entry is replayed. But T1's transaction commit log entry cannot be replayed until T3's commit log entry is replayed. Thus, a cycle wait-for dependency exists.

At this point, the database management system detects that parallel log replayer 1202 is blocked. The database management may then check on demand if a deadlock exists. As discussed above, this may be determined by figuring out the dependencies between various database transactions, and the dependency relationships can be determined based on the transaction IDs associated with the various database transactions.

Once the database management system determines that a deadlock exists, it may select a replication log entry from queue 1206 or 1208 to forward to waiting queue 1212. The database management system may select for removal the first replication log entry (e.g. at the front of a queue) that causes the deadlock. The database management system then forwards this replication log entry to waiting queue 1212. The database management system then checks if the deadlock is resolved. If not, the database management system may continue to select replication log entries to forward to waiting queue 1212 until the deadlock is resolved. After the deadlock is resolved, the database management system can replay the replication log entries in waiting queue 1212 at parallel log replayer 1202.

For example in FIG. 11, the database management system selects T2's delete replication log entry for removal from 1208 and forwards it to waiting queue 1212. As a result, T3's insert replication log entry may be replayed because it is no longer being replayed after T3's transaction commit log entry. Then, once T1's transaction commit log entry is replayed, T2's delete replication log entry can be replayed by parallel log replayer 1212.

Figure 13:
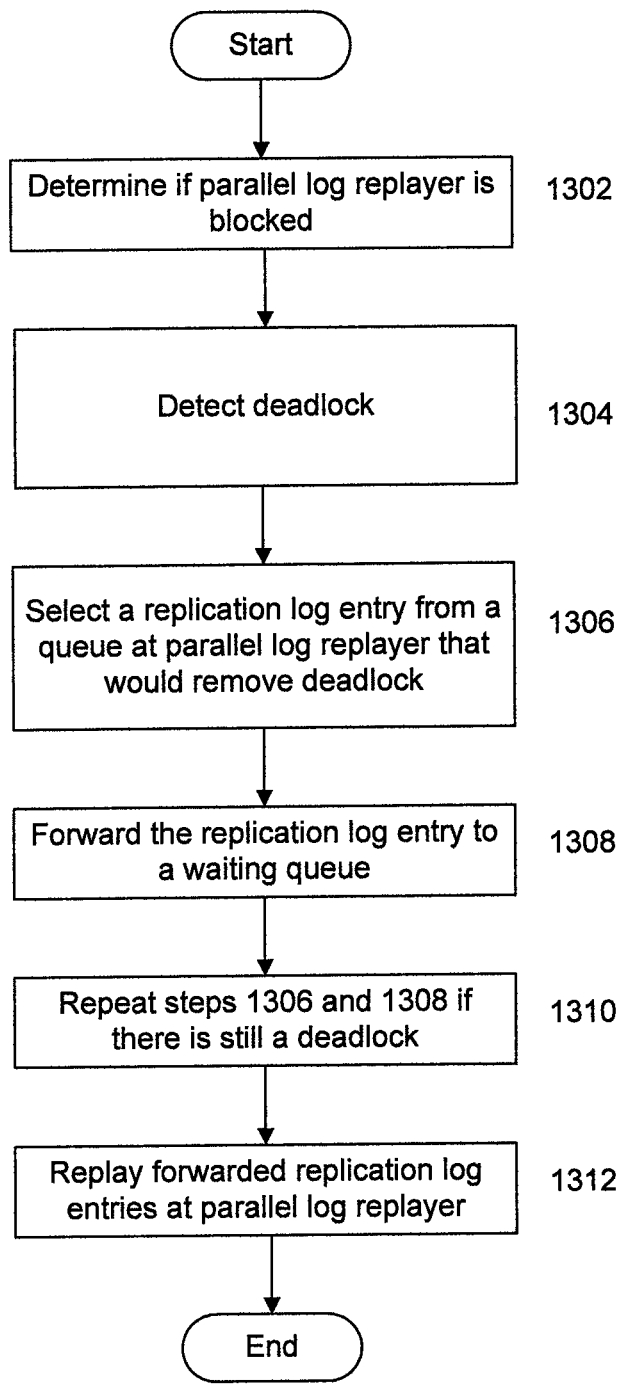
FIG. 13 is a flowchart illustrating a process for dynamically resolving a deadlock by log forwarding, according to an example embodiment.

FIG. 13 is a flowchart for a method 1300 for dynamically resolving deadlock by log forwarding, according to the embodiment above. Method 1300 can be performed by processing logic that can comprise hardware (e.g., circuitry, dedicated logic, programmable logic, microcode, etc.), software (e.g., instructions run on a processing device), or a combination thereof.

In step 1302 of FIG. 13, the database management system determines if the parallel log replayer is blocked.

In step 1304 of FIG. 13, the database management system performs deadlock detection on demand if the parallel log replayer is blocked. Specifically, the database management system determines the dependency relationships among the database transactions to replayed in order to determine if cyclic wait-for relationship exists. As would be appreciated by a person of ordinary skill in the art, this may be determined by checking the transaction ID's associated with the replication log entries and transaction commit log entries.

In step 1306 of FIG. 13, the database management system selects the first replication log entry in a queue at the parallel log replayer that may remove the deadlock. Specifically, the database management system selects the replication log entry that creates a dependency relationship with a transaction commit log entry in the transaction queue and whose removal from the queue at the parallel log replayer would remove deadlock.

In step 1308 of FIG. 13, the database management system forwards the selected replication log entry to the waiting queue for later replay.

In step 1310 of FIG. 13, the database management system checks if the parallel log replayer is still blocked. If it is, the database management system repeats step 1306 to 1308. Otherwise, the deadlock was resolved.

In step 1312 of FIG. 13, the database management system replays the forwarded replication log entries in the waiting queue using the parallel log replayer.

Figure 14:
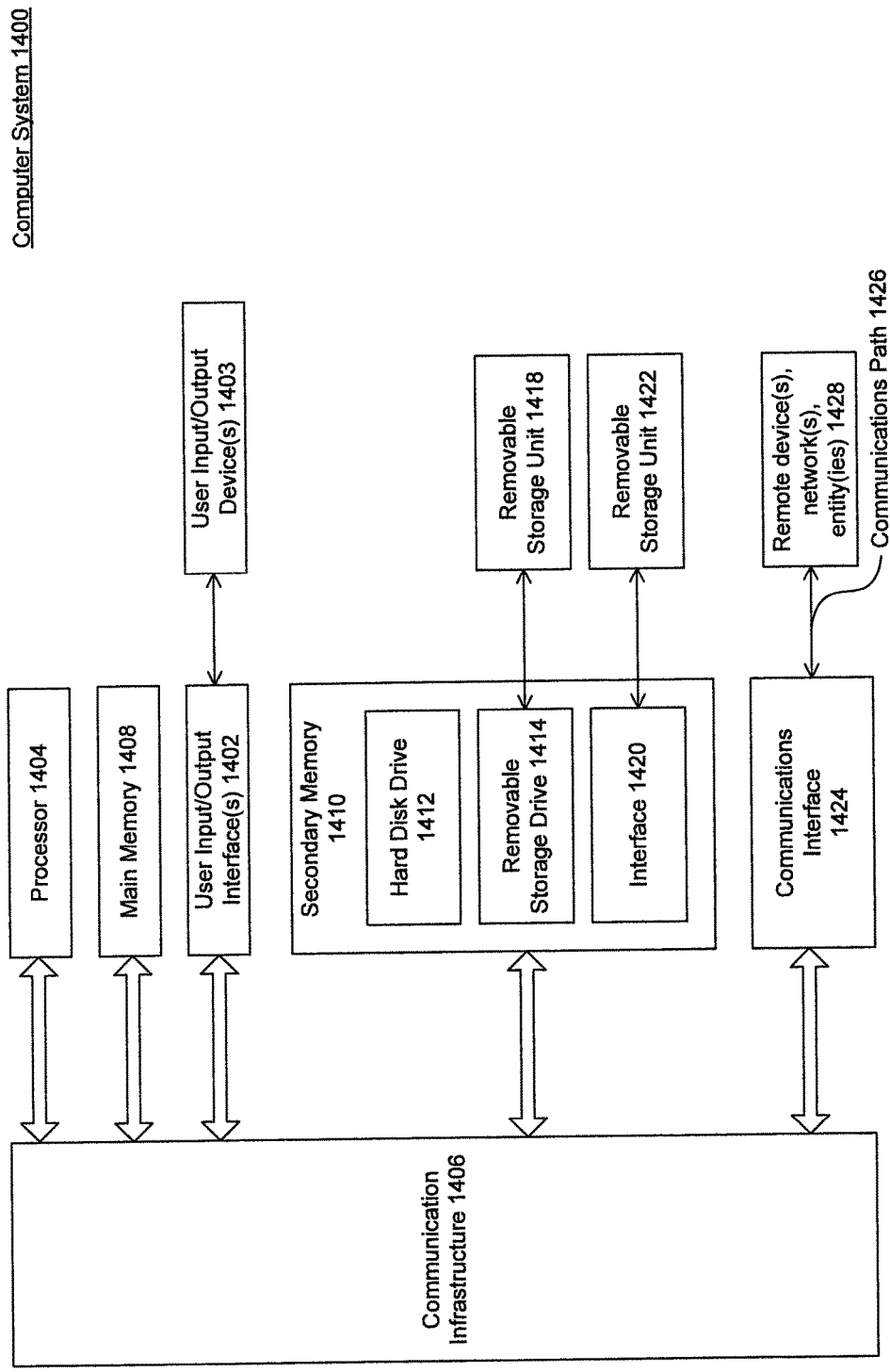
FIG. 14 is an example computer system useful for implementing various embodiments.

Various embodiments can be implemented, for example, using one or more well-known computer systems, such as computer system 14 shown in FIG. 14. Computer system 1400 can be any well-known computer capable of performing the functions described herein.

Computer system 1400 includes one or more processors (also called central processing units, or CPUs), such as a processor 1404. Processor 1404 is connected to a communication infrastructure or bus 1406.

One or more processors 1404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure xx06 through user input/output interface(s) 1402.

Computer system 1400 also includes a main or primary memory 1408, such as random access memory (RAM). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

In an embodiment, a tangible apparatus or article of manufacture comprising a tangible computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 14. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for removing a deadlock during replication from distributed source tables to a replica node, comprising:
    detecting, by at least one processor, a deadlock at a parallel log replayer at a replica node;
    selecting, by the at least one processor, a first replication log entry from a queue of a plurality of queues of the parallel log replayer based on whether removing the first replication log entry from the queue removes the deadlock, wherein the first replication log entry comprises an operation type, a table identifier, and a transaction identifier for a changed row;
    inserting, by the at least one processor, the first replication log entry into a waiting queue;
    removing, by the at least one processor, the first replication log entry from the queue of the plurality of queues of the parallel log replayer;
    replaying, by the at least one processor, a second replication log entry from the queue of the plurality of queues at the parallel log replayer after removing the first replication log entry from the queue of the plurality of queues of the parallel log replayer; and
    replaying, by the at least one processor, the first replication log entry from the waiting queue at the parallel log replayer after replaying the second replication log entry;
    wherein at least one of the detecting, selecting, inserting, removing, replaying the second replication log entry, and replaying the first replication log entry are performed by one or more computers.

2. The method of claim 1, wherein the detecting is performed based on whether the parallel log replayer is blocked.

3. The method of claim 1, the selecting the first replication log entry further comprising:
    selecting the first replication log entry from the head of the queue of the plurality of queues of the parallel log replayer.

4. The method of claim 1, the detecting the deadlock further comprising:
    determining whether a cyclic dependency relationship exists among replication log entries at the parallel log replayer and transaction commit log entries at a transaction commit log replayer.

5. The method of claim 1, the detecting the deadlock further comprising:
    determining whether a cyclic dependency relationship exists among the replication log entries at the parallel log replayer and the transaction commit log entries at a transaction commit log replayer based on transaction IDs associated with the replication log entries and the transaction commit log entries.

6. The method of claim 1, wherein the selecting, inserting, and removing steps are repeated based on whether the deadlock is removed.

7. The method of claim 1, wherein the first replication log entry further comprises a new row image for the changed row.

8. The method of claim 1, wherein the first replication log entry further comprises a row-ID column value associated with the changed row.

9. The method of claim 1, wherein the first replication log entry is based on an insert operation, update operation, or delete operation.

10. A system, comprising:
    a memory; and
    at least one processor coupled to the memory and configured to:
        detect a deadlock at a parallel log replayer at a replica node;
        select first replication log entry from a queue of a plurality of queues of the parallel log replayer based on whether removing the first replication log entry from the queue removes the deadlock, wherein the first replication log entry comprises an operation type, a table identifier, and a transaction identifier for a changed row;
        insert, the first replication log entry into a waiting queue;
        remove the first replication log entry from the queue of the plurality of queues of the parallel log replayer;
        replay a second replication log entry from the queue of the plurality of queues at the parallel log replayer after removing the first replication log entry from the queue of the plurality of queues of the parallel log replayer; and
        replay the first replication log entry from the waiting queue at the parallel log replayer after replaying the second replication log entry.

11. The system of claim 10, wherein the detecting is performed based on whether the parallel log replayer is blocked.

12. The system of claim 10, the at least one processor further configured to:
    select the first replication log entry from the head of the queue of the plurality of queues of the parallel log replayer.

13. The system of claim 10, the at least one processor further configured to:
    determine whether a cyclic dependency relationship exists among replication log entries at the parallel log replayer and transaction commit log entries at a transaction commit log replayer.

14. The system of claim 10, the at least one processor further configured to:
    determine whether a cyclic dependency relationship exists among the replication log entries at the parallel log replayer and the transaction commit log entries at a transaction commit log replayer based on transaction IDs associated with the replication log entries and the transaction commit log entries.

15. The system of claim 10, the at least one processor further configured to:
repeat the selecting, inserting, and removing based on whether the deadlock is removed.

16. A non-transitory computer-readable device having instructions stored thereon that, when executed by at least one computing device, causes the at least one computing device to perform operations comprising:
detecting a deadlock at a parallel log replayer at a replica node;
selecting a first replication log entry from a queue of a plurality of queues of the parallel log replayer based on whether removing the first replication log entry from the queue removes the deadlock, wherein the first replication log entry comprises an operation type, a table identifier, and a transaction identifier for a changed row;
inserting the first replication log entry into a waiting queue;
removing the first replication log entry from the queue of the plurality of queues of the parallel log replayer;
replaying a second replication log entry from the queue of the plurality of queues at the parallel log replayer after removing the first replication log entry from the queue of the plurality of queues of the parallel log replayer; and
replaying the first replication log entry from the waiting queue at the parallel log replayer after replaying the second replication log entry.

17. The non-transitory computer-readable device of claim 16, wherein the detecting is performed based on whether the parallel log replayer is blocked.

18. The non-transitory computer-readable device of claim 16, the selecting comprising:
selecting the first replication log entry from the head of the queue of the plurality of queues of the parallel log replayer.

19. The non-transitory computer-readable device of claim 16, the detecting comprising:
determining whether a cyclic dependency relationship exists among replication log entries at the parallel log replayer and transaction commit log entries at a transaction commit log replayer.

20. The non-transitory computer-readable device of claim 16, the detecting comprising:
determining whether a cyclic dependency relationship exists among the replication log entries at the parallel log replayer and the transaction commit log entries at a transaction commit log replayer based on transaction IDs associated with the replication log entries and the transaction commit log entries.

21. The non-transitory computer-readable device of claim 16, wherein the selecting, inserting, and removing operations are repeated based on whether the deadlock is removed.

* * * * *